United States Patent
Mizutani et al.

[11] Patent Number: 6,143,815
[45] Date of Patent: Nov. 7, 2000

[54] RESIN COMPOSITION AND RESIN MOLDED PRODUCT

[75] Inventors: Haruyasu Mizutani, Ama-gun; Junji Koizumi, Nagoya; Toshio Yuge, Kobe; Mitsuhiro Isomichi, Takatsuki, all of Japan

[73] Assignee: Toyoda Gosei Co., Ltd., Aichi, Japan

[21] Appl. No.: 09/156,607

[22] Filed: Sep. 18, 1998

[30] Foreign Application Priority Data

Sep. 18, 1997 [JP] Japan ................................. 9-273521

[51] Int. Cl.$^7$ ............................ C08K 3/08; C08L 25/02; C08L 25/10; C08L 25/12
[52] U.S. Cl. ........................ 524/441; 524/351; 524/399
[58] Field of Search .............................. 524/441; 523/351

[56] References Cited

U.S. PATENT DOCUMENTS

| | | | |
|---|---|---|---|
| 4,810,540 | 3/1989 | Ellison et al. | 428/31 |
| 5,215,811 | 6/1993 | Reafler et al. | 428/212 |
| 5,350,733 | 9/1994 | Campbell et al. | 503/227 |
| 5,496,630 | 3/1996 | Hawrylko et al. | 428/328 |
| 5,530,051 | 6/1996 | Hirata et al. | 524/441 |
| 5,804,315 | 9/1998 | Takimoto et al. | 428/402 |

FOREIGN PATENT DOCUMENTS

| | | |
|---|---|---|
| 61-49817 | 3/1986 | Japan . |
| 62-20574 | 1/1987 | Japan . |

*Primary Examiner*—Vasu Jagannathan
*Assistant Examiner*—Katarzyna Wyrozebski
*Attorney, Agent, or Firm*—Pillsbury Madison & Sutro Intellectual Property Group

[57] ABSTRACT

A resin composition is disclosed, comprising a thermoplastic resin and a brightening agent, wherein the brightening agent is a scaly brightening agent having an average particle size of from 10 to less than 20 $\mu$m and is added in an amount of of from 1 to 8 parts by weight per 100 parts by weight of the thermoplastic resin; or the brightenng agent is a scaly brightening agent having an average particle size of from 20 to 50 $\mu$m and is added in an amount satisfying the relationship $S \leq 5A+15$ (wherein S is the average particle size thereof ($\mu$m) and A is the addition amount (parts by weight) of the brightening agent per 100 parts by weight of the thermoplastic resin). The resin composition and the resin molded product obtained therefrom give an excellent bright-feeling because the decrease of appearance quality caused by the extraordinary orientation of a scaly brightening agent is minimized.

5 Claims, 3 Drawing Sheets

(A)

(B)

RESIN COMPOSITION AND RESIN MOLDED PRODUCT

FIELD OF THE INVENTION

The present invention relates to a resin composition and a resin molded product which both are reduced in the decrease of surface-appearance quality caused by the extraordinary orientation of a scaly brightening agent and give an excellent bright-feeling.

BACKGROUND OF THE INVENTION

Conventional resin molded products developed for reducing in the generation of a weld line is described, for example, in JP-B-4-27932. (The term "JP-B" as used herein means an "examined Japanese patent publication".)

According to the above reference, a weld line 3 consisting only of a resin containing no metal particles is formed at the junction of resin flows as shown in FIG. 3, because each resin flow, during flowing, has a layer containing no metal particles at its front end.

There is in the above reference description that the weld line 3 is not conspicuous when the average distance (D) between the metal particles and the weld width (H) satisfy the relationship D≧H and when the difference in appearance between each layer containing metal particles 91 and the layer not containing the same is small.

Incidentally, the following is an equation for calculating the average distance (D) between metal particles on the assumption that the metal particles are spherical.

$$D = R(\sqrt[3]{Z} - 1)$$

wherein

D: average distance between the metal particles

R: length corresponding to the average diameter of the metal particles $Z = \pi/(3\sqrt{2} \times V)$ V: ratio of the volume of all metal particles to the total volume of the thermoplastic resin and the metal particles.

However, use of the above equation is unreasonable.

This is because the equation is not of a general character, since the aluminum particles for use in plastics and paints are generally not spherical and it is unusual to use spherical aluminum particles. In general, since the aluminum particles for use in plastics and paints have a flat scaly shape, the above relationship concerning the average distance (D) between metal particles does not hold for the aluminum particles. Consequently, the relationship with the weld width (H) also does not apply.

In the reference cited above, there is a description that the weld line part has a layer containing no metal particles and consisting only of a resin.

In contrast, the present inventors found, through close examination with a microscope, etc., that a resin molded product obtained from 1 part by weight of an aluminum powder (average particle size: 14 μm) which is a scaly brightening agent as an example of a brightening agent and 100 parts by weight of polypropylene has an orientation extraordinary region 12 in which the scaly brightening agent 2 is oriented at an angle of from 45 degrees to a right angle and the orientation angle thereof becomes more close to a right angle as the position thereof is more close to the weld part, as shown in FIG. 1.

This orientation extraordinary region 12 less reflects and more absorbs light than the surrounding parts, and hence looks black.

This phenomenon in which the scaly brightening agent thus orients is not limited to the weld part, but occurs also in parts where the thickness changes, as shown in FIGS. 4 and 5.

As disclosed in JP-B-6-4718, the metal particles which are present in a weld line are distributed at a slightly lower density than those which are present in ordinary parts and are oriented perpendicularly to the surface of the resin molded product. Due to this, the resin molded product, according to the reference, appears to have considerable unevenness of color density especially when the size of the metal particles is not larger than 10 μm.

The present inventors, however, have ascertained the fact that when the addition amount of metal particles exceeds 1 part by weight, the orientation extraordinary region becomes narrower as the proportion of finer metal particles increases and, as a result, the extraordinary weld appearance becomes less conspicuous.

SUMMARY OF THE INVENTION

In view of the above-described problem of the prior art technique, an object of the present invention is to provide a resin composition and a resin molded product in both of which the decrease of appearance quality caused by the extraordinary orientation of a scaly brightening agent is minimized and which give an excellent bright-feeling.

The present invention relates to:

(1) a resin composition comprising a thermoplastic resin and a brightening agent, wherein
the brightening agent is a scaly brightening agent having an average particle size of from 10 to less than 20 μm and is added in an amount of from 1 to 8 parts by weight per 100 parts by weight of the thermoplastic resin;

(2) a resin composition comprising a thermoplastic resin and a brightening agent, wherein
the brightening agent is a scaly brightening agent having an average particle size of from 20 to 50 μm and is added in an amount satisfying the relationship S≦5A+15 (wherein S is the average particle size thereof (μm) and A is the addition amount (parts by weight) of the brightening agent per 100 parts by weight of the thermoplastic resin);

(3) a resin molded product formed by die-molding a resin composition comprising a thermoplastic resin and a brightening agent, wherein
the brightening agent is a scaly brightening agent having an average particle size of from 10 to less than 20 μm and is added in an amount of from 1 to 8 parts by weight per 100 parts by weight of the thermoplastic resin,
the resin molded product has an orientation extraordinary region in which the scaly brightening agent dispersed therein has an orientation angle of 45 degrees or larger, and the orientation extraordinary region has a width of 80 μm or smaller; and (4) a resin molded product formed by die-molding a resin composition comprising a thermoplastic resin and a brightening agent, wherein
the brightening agent is a scaly brightening agent having an average particle size of from 20 to 50 μm and is added in an amount satisfying the relationship S≦5A+15 (wherein S is the average particle size thereof (μm) and A is the addition amount (parts by weight) of the brightening agent per 100 parts by weight of the thermoplastic resin), the resin molded product has an orientation extraordinary region in which the scaly brightening agent dispersed therein has an orientation angle of 45 degrees or larger, and the orientation extraordinary region has a width of 80 μm or smaller.

DETAILED DESCRIPTION OF THE INVENTION

Figure 1:
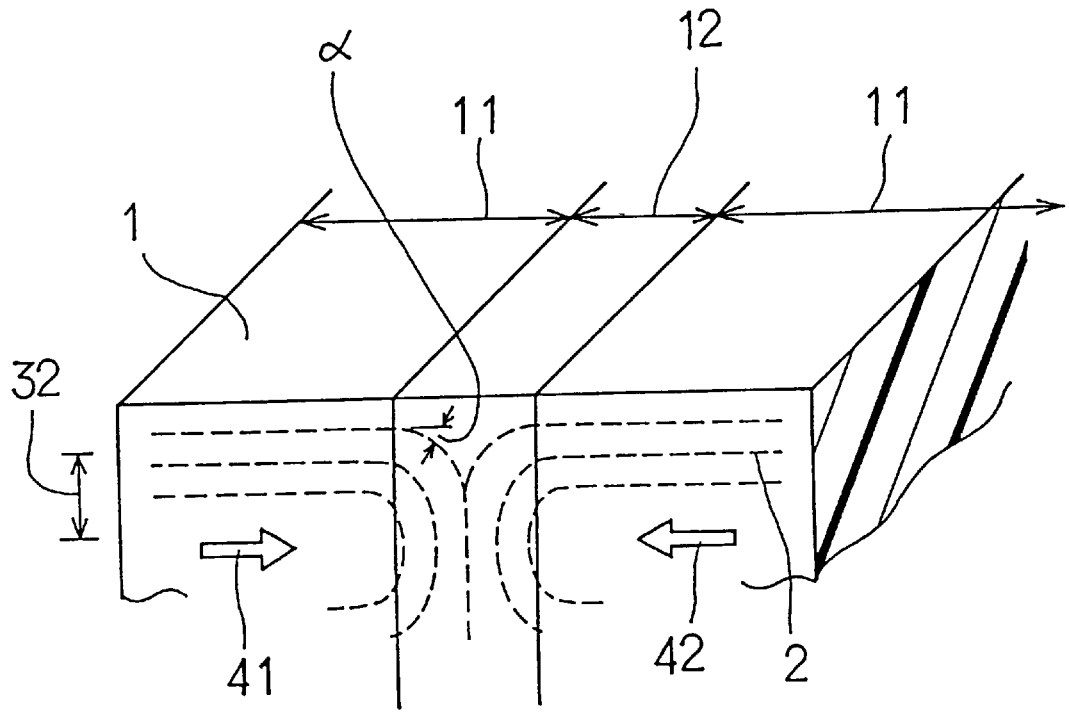
FIG. 1 is views illustrating the orientation of a scaly brightening agent at a section of a molded plate in an Embodiment Example.
Figure 1:
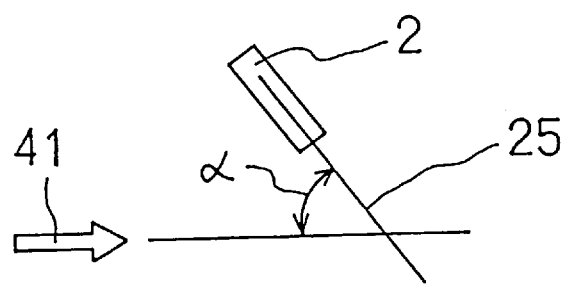

The most noticeable feature of the present invention resides in that the addition amount of the scaly brightening agent varies depending on the average particle size thereof.

In the case where the scaly brightening agent having an average particle size of from 10 to less than 20 μm is employed, this scaly brightening agent is used in an amount of from 1 to 8 parts by weight per 100 parts by weight of the thermoplastic resin.

If the amount of the above scaly brightening agent is smaller than 1 part by weight, the resin composition gives a resin molded product which tends to have a conspicuous weld appearance and gives a reduced bright-feeling. On the other hand, if the amount thereof exceeds 8 parts by weight, the resin has unsatisfactory physical properties (a reduced strength and a reduced surface hardness) and unsatisfactory heat resistance (a reduced heat deformation temperature and an increased coefficient of thermal shrinkage).

In the case where a scaly brightening agent having an average particle size of from 20 to 50 μm is employed, the addition amount (A parts by weight) of this scaly brightening agent, per 100 parts by weight of the thermoplastic resin depends on the average particle size (S μm) of the scaly brightening agent as shown by the following relationship.

$$S \leq 5A+15$$

For example, when a scaly brightening agent having an average particle size of 30 μm is used, the addition amount thereof (A) is 3 parts by weight or larger because 30≦(5A+15).

Even when the addition amount A of the scaly brightening agent is within the range defined by the above relationship, the upper limit thereof is preferably 8 parts by weight. If the addition amount thereof exceeds 8 parts by weight, unsatisfactory resin properties result similar to the above case.

Examples of the thermoplastic resin include polypropylene, polyethylene, polystyrene, AS resins, AES resins, ABS resins, AAS resins, SAS resins, PPO, polyacetals, PPO/PS, PET, PBT, ionomers, acrylic resins, vinyl chloride resins, polycarbonates, PA resins, and alloy materials each consisting of two or more of these resins.

Preferred among those are polypropylene and ABS, AES, and AAS resins because these are general-purpose resins which give moldings having an inconspicuous weld appearance and giving an excellent bright-feeling.

Usable as the scaly brightening agent are ones having an aspect ratio of from 5 to 200. In general, scaly brightening agents having an aspect ratio of from 10 to 100 are preferred. Aspect ratio (As) is defined as As=[average particle size (μm)]/[average particle thickness (μm)]. Examples of such scaly brightening agents include aluminum powders, pearlescent mica pigments, pearl powders, glass powders, metal-plated powders, and metal-coated powders. Preferred among those are aluminum powders because these are general-purpose brightening agents which give moldings having an inconspicuous weld appearance and a molding surface having an excellent bright-feeling.

If a scaly brightening agent having an average particle size exceeding 50 μm is used, the effect of eliminating a weld line is not obtained even when the addition amount thereof is increased. On the other hand, use of a scaly brightening agent having an average particle size of smaller than 10 μm tends to result in a resin molded product which gives a bright-feeling but has an appearance giving a smooth and flat feeling.

Other ingredients may be added to the resin composition of the present invention if necessary. Examples thereof include organic pigments such as Phthalocyanine Blue, Cyanine Green, indanthrene pigments, azo pigments, anthraquinone pigments, perylene pigments, perinone pigments, quinacridone pigments, isoindolinone pigments, thioindigo pigments, and dioxazine pigments; inorganic pigments such as titanium oxide, titanium yellow, red iron oxide, calcined pigments, and carbon black; dyes such as phthalocyanine dyes, anthraquinone dyes, perylene dyes, and perinone dyes; additives such as antioxidants, ultraviolet absorbers, and coupling agents; and dispersants such as metal soaps and low-molecular polyolefins.

In forming a resin molded product from the resin composition described above, the composition which has been regulated so as to give a final molding consisting of ingredients in respective necessary amounts may be directly molded. Alternatively, a compound may be prepared with an extruder and then molded.

It is also possible to use a method in which a dry color or a high-concentration master batch is prepared and is then diluted with a resin and molded.

In the resin composition of the present invention, the addition amount of the scaly brightening agent is regulated according to the average particle size thereof. Because of this, a resin composition can be provided which gives an excellent bright-feeling and gives a resin molded product in which the extraordinary orientation of the scaly brightening agent is minimized.

The present invention furthermore provides, a resin molded product obtained by die-molding the above resin composition, wherein the resin molded product as an orientation extraordinary region in which the scaly brightening agent dispersed therein has an orientation angle of 45 degrees or larger, and the orientation extraordinary region has a width of 80 μm or smaller.

The most noticeable feature of the resin molded product of the present invention is that the resin composition described above is used and that the width of the orientation extraordinary region in the resin molded product is not larger than 80 μm.

The orientation extraordinary region in a resin molded product containing a scaly brightening agent dispersed therein means the region in which the orientation angle a, i.e., the angle between the longitudinal axis of the brightening agent and "a resin-flowing direction during the molding for producing the resin molded product", is 45 degrees or larger (see FIG. 1(A) and (B)).

If the width of the orientation extraordinary region exceeds 80 μm, the weld part has an extraordinary appearance and gives no bright-feeling. The narrower the orientation extraordinary region, the better.

Consequently, the width of the orientation extraordinary region should be regulated to 80 μm or smaller. For attaining such a state, the resin molded product is molded from the resin composition described above.

The resin composition according to the present invention and the resin molded product obtained therefrom are suitable for use as various automotive parts, parts for domestic electrical appliances, interior articles, etc.

Although effective in molding by the injection molding method, the present invention is effective also in a molding method in which molding is conducted under such conditions that at least two resin flows generate and collide with each other within the molding tool.

The present invention will be explained below in more detail by reference to Embodiment Examples thereof together with Comparative Examples, but the invention should not be construed as being limited to these Embodiment Examples.

EMBODIMENT EXAMPLES 1 TO 8

To 100 parts by weight of polypropylene (MFR, 30 g/10 min; density, 0.91 g/cm$^3$) was added each of aluminum powders having various average particle sizes as a scaly brightening agent in the amount (parts by weight) shown in Table 1. Each resulting mixture was kneaded and homogenized with an extruder and then pelletized.

Figure 2:
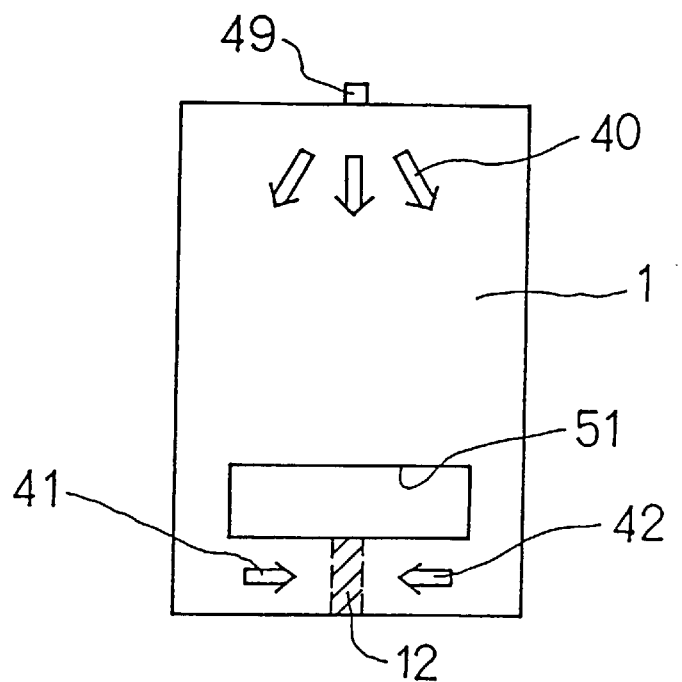
FIG. 2 is a view illustrating the molded plate in the Embodiment Example.
Figure 3:
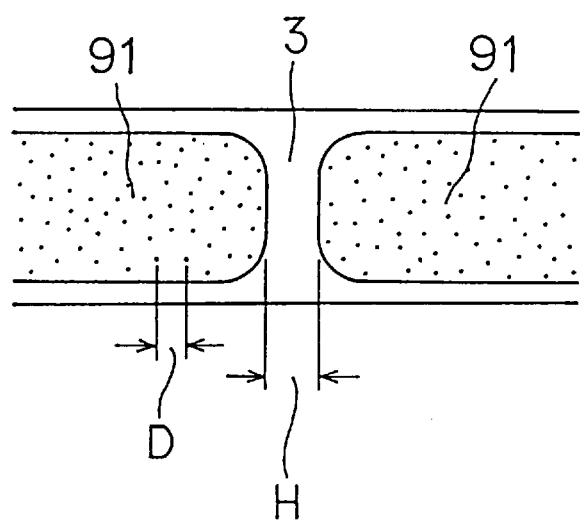
FIG. 3 is a view illustrating a weld line part of a conventional resin molded product.
Figure 4:
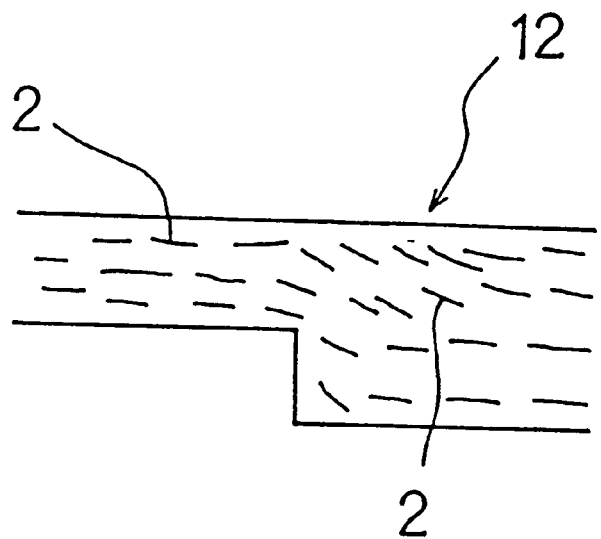
FIG. 4 is a view illustrating an orientation extraordinary region in a conventional molding.
Figure 5:
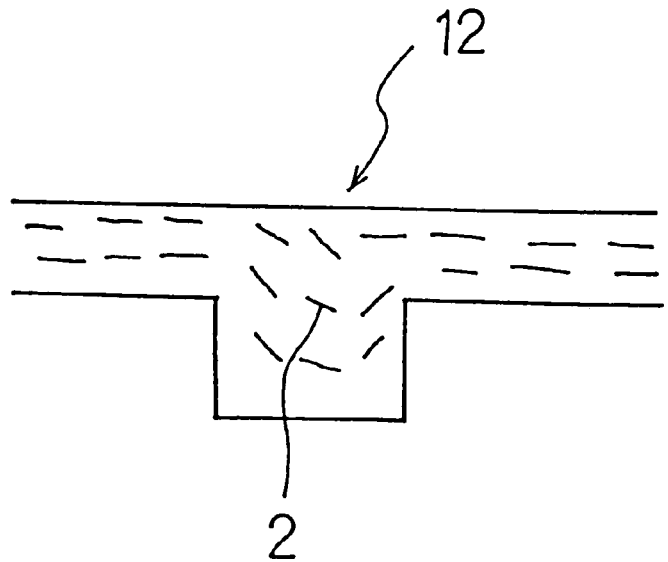
FIG. 5 is a view illustrating another orientation extraordinary region in the conventional molding.

Thereafter, the pelletized compositions each was formed into a molded plate 1 of the shape shown in FIG. 2 using an injection molding machine. This molded plate 1 was a rectangular plate, as shown in the figure, which had dimensions of 48 mm by 88 mm by 3 mm (thickness). It had a through space 51 as shown in a lower part of the figure. Consequently, resin injection from a gate 49 resulted in the generation of an orientation extraordinary region 12 downstream from the part corresponding to the core for forming the space. In the figure, arrows 40, 41, and 42 indicate resin-flowing directions.

A section part of the molded plate which was close to the surface thereof is shown in FIG. 1(A).

The figure shows that the resin molded product 1 had an orientation extraordinary region 12 in a part where resin composition flows 41 and 42 from two gates of the molding tool had met each other.

As stated hereinabove, this orientation extraordinary region 12 means the region in which the orientation angle α, i.e., the angle between the longitudinal axis of the scaly brightening agent 2 dispersed in the resin molded product and "a resin-flowing direction during the molding for producing the resin molded product", is 45 degrees or larger (see FIGS. 1(A) and (B)).

The parts respectively located on both sides of the orientation extraordinary region 12 constituted ordinary parts 11 in which the scaly brightening agent 2 was evenly dispersed in an ordinary manner.

A part close to the surface had a region 32 in which the scaly brightening agent 2 had oriented at an angle of 45 degrees or larger and which had been formed by the collision of the front ends of the two resin flows 41 and 42.

FIG. 1(B) shows an orientation angle α, which is the angle between the resin-flowing direction 41 and the axis 25 of the scaly brightening agent 2.

The surfaces of the molded plates (see FIG. 2) were visually evaluated for an extraordinary appearance and a bright-feeling (metallic feeling) in the weld part.

The average particle size, aspect ratio (As), and addition amount of each aluminum powder used above are shown in Table 1 together with the evaluation results obtained.
(Criteria for Weld Part Appearance Evaluation)
  ○: Extraordinary weld appearance was not observed.
  Δ: Extraordinary weld appearance was slightly observed.
  ×: Extraordinary weld appearance was observed.
(Criteria for Bright-feeling Evaluation)
  ○: Bright-feeling was observed.
  ×: Bright-feeling was not observed.
(Width of Orientation Extraordinary Region)
The width of the orientation extraordinary region which had appeared on the surface of each molded plate was measured.

Comparative Examples 1 to 7

Similar to the Embodiment Examples given above, each of the aluminum powders was added to 100 parts by weight of polypropylene (MFR, 30 g/10 min; density, 0.91 g/cm$^3$) in the amount shown in Table 1, and the resulting mixtures each was kneaded and homogenized with an extruder and then pelletized. Thereafter, molded plates having the same shape and dimensions as in the Embodiment Examples given above were produced with an injection molding machine.

The surfaces of the molded plates were visually evaluated for the state of a generated weld line. The results obtained are shown in Table 2.

TABLE 1

|  |  | Aspect ratio | Embodiment Example | | | | | | | |
|---|---|---|---|---|---|---|---|---|---|---|
|  |  |  | 1 | 2 | 3 | 4 | 5 | 6 | 7 | 8 |
| Composition (parts by weight) | Polypropylene | | 100 | 100 | 100 | 100 | 100 | 100 | 100 | 100 |
|  | Aluminum powder (60 μm) | 7.7 | | | | | | | | |
|  | Aluminum powder (50 μm) | 18.5 | 8 | | | | | | | |
|  | Aluminum powder (30 μm) | 29.9 | | 6 | 4 | | | | | |
|  | Aluminum powder (20 μm) | 46.0 | | | | 2 | | | | |
|  | Aluminum powder | 48.0 | | | | | 2 | 8 | | |

TABLE 1-continued

| | | Aspect ratio | \multicolumn{8}{c}{Embodiment Example} |
| | | | 1 | 2 | 3 | 4 | 5 | 6 | 7 | 8 |
|---|---|---|---|---|---|---|---|---|---|---|
| | Aluminum powder (15 μm) | 54.0 | | | | | | | 2 | 1 |
| | Aluminum powder (7 μm) | 58.0 | | | | | | | | |
| Molding appearance | Bright-feeling (metallic feeling) | | o | o | o | o | o | o | o | o |
| | Surface-appearance, visual | | o | o | o | o | o | o | o | o |
| Width of orientation extraordinary region (μm) | | | 75 | 50 | 65 | 40 | 35 | 10 | 25 | 55 |

TABLE 2

| | | Aspect ratio | \multicolumn{7}{c}{Comparative Example} |
| | | | 1 | 2 | 3 | 4 | *5 | 6 | 7 |
|---|---|---|---|---|---|---|---|---|---|
| Composition (parts by weight) | Polypropylene | | 100 | 100 | 100 | 100 | 100 | 100 | 100 |
| | Aluminum powder (60 μm) | 7.7 | 8 | | | | | | |
| | Aluminum powder (50 μm) | 18.5 | | 6 | | | | | |
| | Aluminum powder (30 μm) | 29.9 | | | 2 | | | | |
| | Aluminum powder (20 μm) | 46.0 | | | | 0.5 | | | |
| | Aluminum powder (15 μm) | 48.0 | | | | | 10 | | |
| | Aluminum powder (10 μm) | 54.0 | | | | | | 0.5 | |
| | Aluminum powder (7 μm) | 58.0 | | | | | | | 2 |
| Molding appearance | Bright-feeling (metallic feeling) | | o | o | o | o | o | o | x |
| | Surface-appearance, visual | | x | Δ | Δ | Δ | o | Δ | o |
| Width of orientation extraordinary region (μm) | | | 100 | 85 | 95 | 90 | 7 | 80 | 20 |

*The molding of Comparative Example 5 had impaired rigidity, although rated as o with respect to bright-feeling (metallic feeling) and visual surface-appearance.

As is apparent from the results of Table 1, the molded plates obtained in Embodiment Examples 1 to 8 according to the present invention were excellent in both bright-feeling and surface-appearance. Furthermore, the width of the orientation extraordinary region in each of these molded plates was not larger than 80 μm.

As is apparent from the results of Table 2, the molded plate obtained in Comparative Example 1 had a poor surface-appearance and a large width of the orientation extraordinary region, because the aluminum powder incorporated therein had a high average particle size of 60 μm. The molded plates obtained in the other Comparative Examples also had a width of the orientation extraordinary region exceeding 80 μm or were inferior in surface-appearance or bright-feeling, because the aluminum powders had too large an average particle size or had been incorporated in an amount outside the range specified in the present invention.

According to the present invention, a resin composition and a resin molded product can be provided in both of which the decrease of appearance quality caused by the extraordinary orientation of a scaly brightening agent is minimized and which give an excellent bright-feeling.

While the invention has been described in detail and with reference to specific embodiments thereof, it will be apparent to one skilled in the art that various changes and modifications can be made therein without departing from the spirit and scope thereof.

What is claimed is:

1. A resin molded product formed by die-molding, the resin composition comprising a thermoplastic resin and a brightening agent dispersed therein, wherein said brightening agent is a scaly brightening agent having an average particle size of from 10 to less than 20 μm and is added in an amount from 1 to 8 parts by weight per 100 parts by weight of the thermoplastic resin; said resin molded product has a region in which the scaly brightening agent has an orientation angle of 45 degrees or larger, wherein said orientation angle lies at an angle between a longitudinal axis of the scaly brightening agent and a direction alone the resin flow; and said region has a width of 80 μm or smaller.

2. A resin molded product formed by die-molding the resin composition comprising a thermoplastic resin and a brightening agent dispersed therein, wherein said brightening agent is a scaly brightening agent having an average particle size of from 20 to 50 μm and is added in an amount satisfying the relationship S≦5A+15 (wherein S is the average particle size thereof (μm) and A is the addition amount (parts by weight) of the brightening agent per 100 parts by weight of the thermoplastic resin); and said resin molded product has a region in which the scaly brightening agent has an orientation angle of 45 degrees or larger, wherein said orientation angle lies at an angle between a longitudinal axis of the scaly brightening and a direction along the resin flow; and said orientation extraordinary region has a width of 80 μm or smaller.

3. The resin molded product of claim 1, wherein said brightening agent has an aspect ratio of from 5 to 200.

4. The resin molded product of claim 1, wherein said thermoplastic resin is at least one resin selected from the group consisting of polypropylene, polyethylene, polystyrene, AS resins, AES resins, ABS resins, AAS resins, SAS resins, PPO, polyacetals, PPO/PS, PET, PBT, ionomers, acrylic resins, vinyl chloride resins, polycarbonates, PA resins, and alloy materials each consisting of two or more of these resins.

5. The resin molded product of claim 2, wherein said brightening agent has an aspect ratio of from 5 to 200.

* * * * *